United States Patent
Adler

(10) Patent No.: US 8,950,380 B2
(45) Date of Patent: Feb. 10, 2015

(54) DIAGNOSTIC METHOD FOR A FUEL PRESSURE SENSOR IN THE COMMON RAIL OF AN INTERNAL COMBUSTION ENGINE

(75) Inventor: Christoph Adler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 757 days.

(21) Appl. No.: 13/265,784

(22) PCT Filed: Mar. 30, 2010

(86) PCT No.: PCT/EP2010/054197
§ 371 (c)(1),
(2), (4) Date: Oct. 21, 2011

(87) PCT Pub. No.: WO2010/121891
PCT Pub. Date: Oct. 28, 2010

(65) Prior Publication Data
US 2012/0037119 A1    Feb. 16, 2012

(30) Foreign Application Priority Data
Apr. 23, 2009 (DE) .......................... 10 2009 018 654

(51) Int. Cl.
F02D 41/22 (2006.01)
F02D 41/08 (2006.01)
F02D 41/24 (2006.01)
F02M 3/00 (2006.01)

(52) U.S. Cl.
CPC ............... *F02D 41/222* (2013.01); *F02M 3/00* (2013.01); *F02D 41/08* (2013.01);
(Continued)

(58) Field of Classification Search
CPC ............... F02D 41/22; F02D 201/223; F02D 2041/224; F02D 2041/227; F02D 41/08
USPC ............... 123/339.1, 339.14, 339.15, 339.19, 123/458, 198 D, 494; 73/114.43; 701/102–104, 107, 114, 115
See application file for complete search history.

(56) References Cited

U.S. PATENT DOCUMENTS

| 6,715,468 B2 * | 4/2004 | Uchiyama et al. ........ 123/339.15 |
| 7,025,050 B2 * | 4/2006 | Oono et al. .................... 123/690 |

(Continued)

FOREIGN PATENT DOCUMENTS

| DE | 10205377 A1 | 8/2003 | ............. F02D 41/22 |
| DE | 102007000152 A1 | 9/2007 | ............. F02D 41/22 |

(Continued)

OTHER PUBLICATIONS

International PCT Search Report and Written Opinion, PCT/EP2010/054197, 25 pages.

*Primary Examiner* — Thomas Moulis
(74) *Attorney, Agent, or Firm* — King & Spalding L.L.P.

(57) ABSTRACT

An internal combustion engine has a fuel pressure sensor, the measured value of which represents a fuel pressure in a fuel reservoir of the internal combustion engine. Fuel is metered from the fuel reservoir into a combustion chamber. In a predefined idle operating state (LBZ) of the internal combustion engine, a speed of the internal combustion engine is regulated so as to reach a specific idling speed. During the regulation process, a value of a manipulated variable for metering the fuel is determined, the value being required to reach the specific idling speed. Furthermore, it is concluded that the measured fuel pressure value contains an error (ERR) when the determined required value of the manipulated variable differs from a reference value (REF) predefined for the predefined idle operating state (LBZ) of the internal combustion engine by at least a given amount or factor.

14 Claims, 4 Drawing Sheets

(52) U.S. Cl.
CPC ....... *F02D 41/2432* (2013.01); *F02D 41/2474*
(2013.01); *F02D 2041/223* (2013.01); *F02D
2200/0602* (2013.01); *F02D 2200/0604*
(2013.01); *Y02T 10/40* (2013.01)
USPC .... 123/458; 123/339.15; 123/494; 123/198 D

(56) References Cited

U.S. PATENT DOCUMENTS

| | | | |
|---|---|---|---|
| 7,472,690 B2 * | 1/2009 | Takayanagi et al. | 123/446 |
| 7,765,991 B2 * | 8/2010 | Thomas et al. | 123/520 |
| 8,091,531 B2 * | 1/2012 | Lucido et al. | 123/446 |
| 8,806,927 B2 * | 8/2014 | Hofmeister et al. | 73/114.43 |
| 2005/0263146 A1 | 12/2005 | Oono et al. | 123/690 |
| 2012/0265424 A1 * | 10/2012 | Dolker | 701/104 |
| 2014/0053813 A1 * | 2/2014 | Fukuda et al. | 123/478 |

FOREIGN PATENT DOCUMENTS

| | | | | |
|---|---|---|---|---|
| DE | 102006026639 A1 | 12/2007 | | F02D 41/22 |
| DE | 102007015876 A1 | 12/2007 | | F02D 41/22 |
| EP | 1826385 A1 | 8/2007 | | F02D 41/14 |

\* cited by examiner

DIAGNOSTIC METHOD FOR A FUEL PRESSURE SENSOR IN THE COMMON RAIL OF AN INTERNAL COMBUSTION ENGINE

CROSS-REFERENCE TO RELATED APPLICATIONS

This application is a U.S. National Stage Application of International Application No. PCT/EP2010/054197 filed Mar. 30, 2010, which designates the United States of America, and claims priority to German Application No. 10 2009 018 654.9 filed Apr. 23, 2009, the contents of which are hereby incorporated by reference in their entirety.

TECHNICAL FIELD

The invention relates to a method and to a device for operating an internal combustion engine.

BACKGROUND

High demands are placed on internal combustion engines, in particular those in motor vehicles. The pollutant emissions are subject to legal regulations and the customer demands low fuel consumption, safe and reliable operation, and low servicing costs. To meet said demands, reliable operation of the internal combustion engine is required, during which in particular erroneous injections are avoided.

SUMMARY

According to various embodiments, a method and a device for operating an internal combustion engine can be provided, by means of which method and device a measurement value of a fuel pressure sensor of the internal combustion engine can be checked for plausibility in a simple manner.

According to an embodiment, in a method for operating an internal combustion engine which comprises a fuel pressure sensor, the measurement value of which is representative of a fuel pressure in a fuel accumulator of the internal combustion engine from which fuel is metered into a combustion chamber of the internal combustion engine, in a predefined idle operating state of the internal combustion engine,
  a rotational speed of the internal combustion engine is regulated to a predefined idle rotational speed and, during the course of said regulation, a value, which is required for attaining the predefined idle rotational speed, of an actuating variable for the metering of the fuel is determined, and
  an error of the measurement value of the fuel pressure sensor is inferred if the determined required value of the actuating value deviates by at least a predefined magnitude or factor from a reference value predefined for the predefined idle operating state of the internal combustion engine.

According to a further embodiment, as a function of a degree of deviation of the determined required value of the actuating variable from the predefined reference value, by means of a predefined characteristic map, a magnitude or factor can be determined by which the measurement value of the fuel pressure sensor deviates from an actual fuel pressure in the fuel accumulator. According to a further embodiment, the actual fuel pressure in the fuel accumulator can be determined as a function of the determined magnitude or factor by which the measurement value of the fuel pressure sensor deviates from the actual fuel pressure in the fuel accumulator, and as a function of the measurement value of the fuel pressure sensor.

According to another embodiment, in a method for operating an internal combustion engine which comprises a fuel pressure sensor, the measurement value of which is representative of a fuel pressure in a fuel accumulator of the internal combustion engine from which fuel is metered into a combustion chamber of the internal combustion engine, in a predefined idle operating state of the internal combustion engine,
  the measurement value of the fuel pressure sensor is detected,
  a rotational speed of the internal combustion engine is regulated to a predefined idle rotational speed and, during the course of said regulation, a first value, which is required for attaining the predefined idle rotational speed, of an actuating variable for the metering of the fuel is determined under the assumption that the fuel pressure sensor is functioning correctly,
  a fuel pressure check value is determined as a function of the detected measurement value of the fuel pressure sensor and as a function of a predefined trim value,
  the rotational speed of the internal combustion engine is regulated to the predefined idle rotational speed under the assumption that the determined fuel pressure check value is the measurement value of the fuel pressure sensor, and during the course of said regulation, a second value, which is required for attaining the predefined idle rotational speed, of the actuating variable for the metering of the fuel is determined, and
  the predefined trim value is stored, assigned to a degree of deviation of the determined second value from the determined first value, in a characteristic map.

According to a further embodiment of one of the above methods, the actuating variable can be representative of a fuel injection quantity or an injection valve opening duration. According to a further embodiment of one of the above methods the required injection valve opening duration for the metering of the fuel can be determined as a function of the measurement value of the fuel pressure sensor and the required fuel injection quantity.

According to yet another embodiment, a device for operating an internal combustion engine, the internal combustion engine comprising a fuel pressure sensor, the measurement value of which is representative of a fuel pressure in a fuel accumulator of the internal combustion engine from which fuel can be metered into a combustion chamber of the internal combustion engine, can be designed in order, in a predefined idle operating state of the internal combustion engine,
  to regulate a rotational speed of the internal combustion engine to a predefined idle rotational speed and, during the course of said regulation, to determine a value, which is required for attaining the predefined idle rotational speed, of an actuating variable for the metering of the fuel, and
  to infer an error of the measurement value of the fuel pressure sensor if the determined required value of the actuating value deviates by at least a predefined magnitude or factor from a reference value predefined for the predefined idle operating state of the internal combustion engine.

According to yet another embodiment, a device for operating an internal combustion engine, the internal combustion engine comprising a fuel pressure sensor, the measurement value of which is representative of a fuel pressure in a fuel accumulator of the internal combustion engine from which fuel is metered into a combustion chamber of the internal combustion engine, may be designed in order, in a predefined idle operating state of the internal combustion engine, to detect the measurement value of the fuel pressure sensor, to regulate a rotational speed of the internal combustion engine to a predefined idle rotational speed and, during the course of said regulation, to determine a first value, which is required for attaining the predefined idle rotational speed, of an actuating variable for the metering of the fuel, under the assumption that the fuel pressure sensor is functioning correctly, to determine a fuel pressure check value as a function of the detected measurement value of the fuel pressure sensor and as a function of a predefined trim value, to regulate the rotational speed of the internal combustion engine to the predefined idle rotational speed under the assumption that the determined fuel pressure check value is the measurement value of the fuel pressure sensor, and during the course of said regulation, to determine a second value, which is required for attaining the predefined idle rotational speed, of the actuating variable for the metering of the fuel, and to assign the predefined trim value to a degree of deviation of the determined second value from the determined first value, and to store said assignment in a characteristic map.

BRIEF DESCRIPTION OF THE DRAWINGS

Exemplary embodiments will be explained below on the basis of the schematic drawings, in which.

Elements of the same design or function are provided with the same reference symbols throughout the figures.

DETAILED DESCRIPTION

Figure 1:
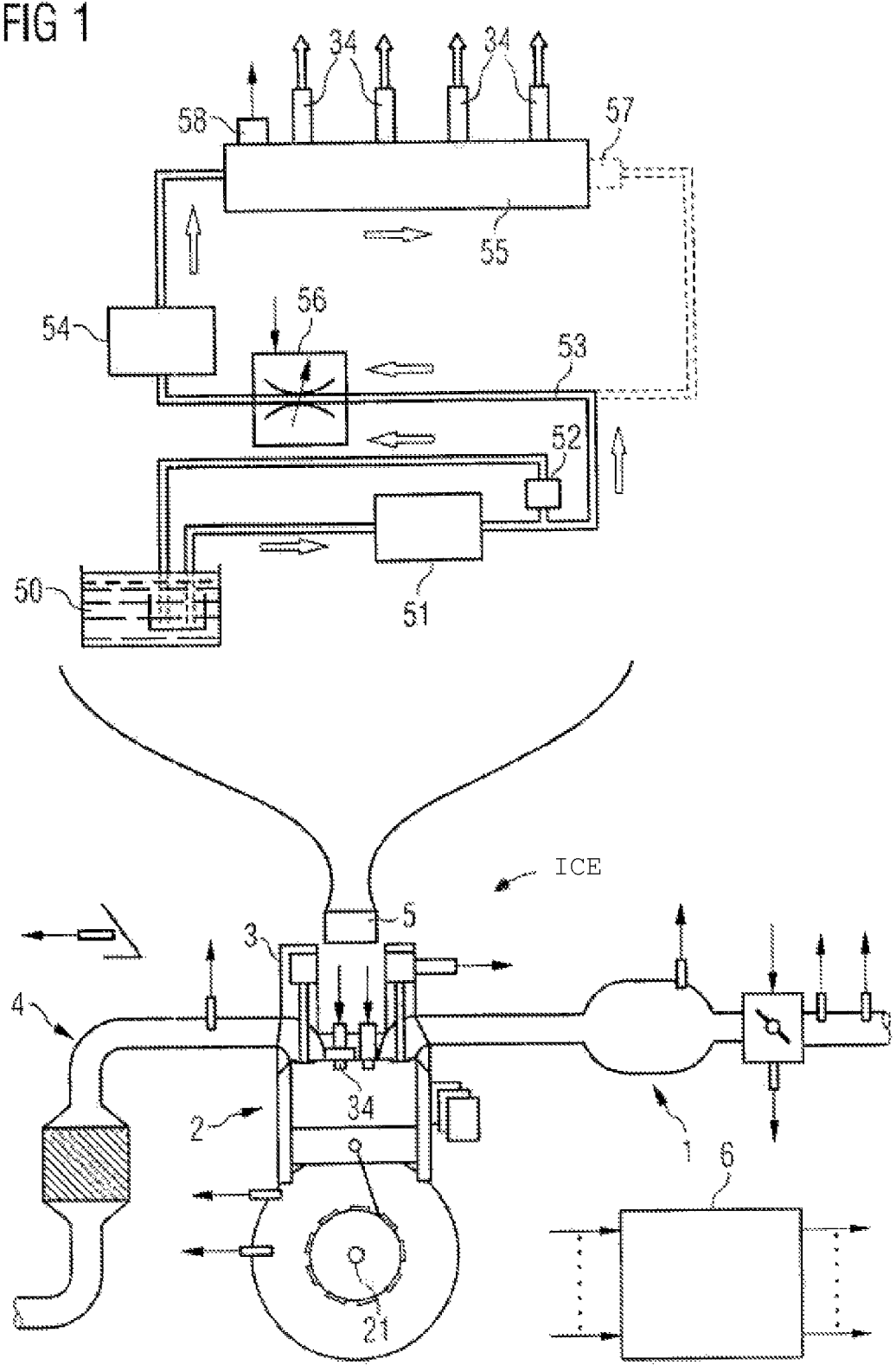
FIG. 1 shows an internal combustion engine.

According to a first aspect, in a method and a corresponding device for operating an internal combustion engine, the internal combustion engine comprises a fuel pressure sensor, the measurement value of which is representative of a fuel pressure in a fuel accumulator of the internal combustion engine from which fuel is metered into a combustion chamber of the internal combustion engine. In a predefined idle operating state of the internal combustion engine, a rotational speed of the internal combustion engine is regulated to a predefined idle rotational speed. During the course of said regulation, a value, which is required for attaining the predefined idle rotational speed, of an actuating variable for the metering of the fuel is determined. An error of the measurement value of the fuel pressure sensor is inferred if the determined required value of the actuating value deviates by at least a predefined magnitude or factor from a reference value predefined for the predefined idle operating state of the internal combustion engine.

The advantage is that the measurement value of the fuel pressure sensor can thus be checked for plausibility in a simple manner, and the error of the measurement value of the fuel pressure sensor can thus be identified in a very simple and reliable manner. In particular, the plausibility checking of the measurement value of the fuel pressure sensor is possible in a simple and reliable manner. The error of the measurement value of the fuel pressure sensor can be identified in a simple and reliable manner in particular if an actual fuel pressure in the fuel accumulator is non-zero.

The various embodiments are based on the realization that, if a measurement value of the fuel pressure sensor is erroneous, for example owing to a defect of the fuel pressure sensor, the value, which is required for attaining the predefined idle rotational speed, of the actuating variable deviates from a corresponding value which would be determined if the fuel pressure sensor were functioning correctly.

In one embodiment, as a function of a degree of deviation of the determined required value of the actuating variable from the predefined reference value, by means of a predefined characteristic map, a magnitude or factor is determined by which the measurement value of the fuel pressure sensor deviates from an actual fuel pressure in the fuel accumulator. The advantage is that, in this way, not only is it possible to infer the error of the measurement value of the fuel pressure sensor, but rather the deviation of the measured fuel pressure from the actual fuel pressure can also be determined quantitatively in a very simple manner. For example, a severity of the error of the measurement value of the fuel pressure sensor can thus be determined, and as a function thereof, countermeasures can be implemented or an error message can be output which for example prompts an exchange of the fuel pressure sensor. Stored in the predefined characteristic map is for example an assignment between the degree of deviation of the determined required value of the actuating variable from the predefined reference value and the magnitude or factor by which the measurement value of the fuel pressure deviates from an actual fuel pressure in the fuel accumulator.

In this context, it is advantageous if the fuel pressure in the fuel accumulator is determined as a function of the determined magnitude or factor by which the measurement value of the fuel pressure sensor deviates from the actual fuel pressure in the fuel accumulator, and as a function of the measurement value of the fuel pressure sensor. The advantage is that, in this way, despite the erroneous measurement value of the fuel pressure sensor, the operation of the internal combustion engine can continue with a fuel pressure value which at least approximates to the actual fuel pressure. Reliable operation of the internal combustion engine can thus be made possible even in the event of an error. This is also very simple.

According to a second aspect, in a method and a corresponding device for operating an internal combustion engine, the internal combustion engine comprises a fuel pressure sensor, the measurement value of which is representative of a fuel pressure in a fuel accumulator of the internal combustion engine from which fuel is metered into a combustion chamber of the internal combustion engine. In a predefined idle operating state of the internal combustion engine, the measurement value of the fuel pressure sensor is detected. A rotational speed of the internal combustion engine is regulated to a predefined idle rotational speed. During the course of said regulation, a first value, which is required for attaining the predefined idle rotational speed, of an actuating variable for the metering of the fuel is determined under the assumption that the fuel pressure sensor is functioning correctly. A fuel pressure check value is determined as a function of the detected measurement value of the fuel pressure sensor and as a function of a predefined trim value. The rotational speed of the internal combustion engine is regulated to the predefined idle rotational speed under the assumption that the determined fuel pressure check value is the measurement value of the fuel pressure sensor. During the course of said regulation, a second value, which is required for attaining the predefined idle rotational speed, of the actuating variable for the metering of the fuel is determined. The predefined trim value is stored, assigned to a degree of deviation of the determined second value from the determined first value, in a characteristic map.

The advantage is that, in this way, it is possible in a very simple manner to determine and predefine the characteristic map which, in an embodiment of the first aspect, can be used as the predefined characteristic map. The method and the corresponding device according to the second aspect thus contribute to quantitatively determining the error of the measurement value of the fuel pressure sensor. The method according to the second aspect is preferably carried out when the fuel pressure sensor is operating reliably, that is to say is functioning correctly, and the measurement value of the fuel pressure sensor correspondingly substantially represents the actual fuel pressure in the fuel accumulator, that is to say there is no error in the measurement value of the fuel pressure sensor. For example, the method according to the first aspect may be carried out before the execution of the method according to the second aspect, in order to ensure that the error of the measurement value of the fuel pressure sensor is not present. It may however also be provided, for example, that the method according to the second aspect is executed when conditions are present under which it is ensured in some other way that the error of the measurement value of the fuel pressure sensor is not present, for example under laboratory conditions.

Various embodiments are based on the realization that, by artificially falsifying the measurement value of the fuel pressure sensor, it is possible to obtain the same effect as that which arises when the error of the measurement value is actually present. Here, the falsification may be realized in a very simple manner by means of the trim value, which for example represents the magnitude or factor by which, in the event of an error, the measurement value of the fuel pressure differs from the actual fuel pressure. The predefined reference value of the first aspect preferably corresponds to the first value which is determined under the assumption that the fuel pressure sensor is functioning correctly and therefore that the measurement value of the fuel pressure sensor is error-free. The second value correspondingly corresponds to the value, determined when there is an error present in the measurement value of the fuel pressure sensor, for the metering of the fuel according to the first aspect.

In one embodiment of the first and second aspect, the actuating variable is representative of a fuel injection quantity or an injection valve opening duration.

The advantage is that the error of the measurement value of the fuel pressure sensor or the characteristic map can then be determined in a particularly simple and reliable manner. The actuating variable may however also be for example a torque of the internal combustion engine.

In this connection, it is advantageous for the required injection valve opening duration for the metering of the fuel to be determined as a function of the measurement value of the fuel pressure sensor and the required fuel injection quantity. The advantage is that this is very simple.

An internal combustion engine ICE comprises an intake tract 1, an engine block 2, a cylinder head 3 and an exhaust tract 4. The engine block 2 preferably comprises a plurality of cylinders which have pistons and connecting rods via which said pistons are coupled to a crankshaft 21.

The cylinder head 3 comprises a valve train having a gas inlet valve, a gas outlet valve and valve drives. The cylinder head 3 also comprises an injection valve 34.

Also provided is a fuel supply device 5. The fuel supply device 5 comprises a fuel tank 50 which is connected via a first fuel line to a low-pressure pump 51. At the outlet side, the low-pressure pump 51 is operatively connected to a feed line 53 of a high-pressure pump 54. There may also be provided at the outlet side of the low-pressure pump 51 a mechanical regulator 52 which is connected at the outlet side via a further fuel line to the fuel tank 50. The low-pressure pump 51, the mechanical regulator 52, the fuel line, the further fuel line and the feed line 53 form a low-pressure circuit.

The low-pressure pump 51 is preferably designed such that, during operation of the internal combustion engine, said low-pressure pump always provides an adequately high fuel quantity which ensures that a predefined low pressure is not undershot. The feed line 53 is conducted to the high-pressure pump 54, which at the outlet side delivers the fuel to a fuel accumulator 55. The high-pressure pump 54 is driven for example by the camshaft and therefore, at a constant rotational speed of the crankshaft 21, delivers a constant fuel volume into the fuel accumulator 55. The injection valves 34 are operatively connected to the fuel accumulator 55. The fuel is therefore supplied to the injection valves 34 via the fuel accumulator 55.

In the approach to the high-pressure pump 54, that is to say upstream of the high-pressure pump 54, there may be provided a volume flow control valve 56 by means of which a volume flow that is supplied to the high-pressure pump 54 can be set. A predefined fuel pressure can be set in the fuel accumulator 55 by means of corresponding actuation of the volume flow control valve 56.

The fuel supply device 5 may also be provided with an electromechanical pressure regulator 57 at the outlet side of the fuel accumulator 55 and with a return line to the low-pressure circuit. As a function of an actuating signal of the electromechanical pressure regulator 57, the electromechanical pressure regulator 57 is closed when the fuel pressure in the fuel accumulator 55 falls below a fuel pressure predefined by the actuating signal, and opened when the fuel pressure in the fuel accumulator 55 exceeds the predefined fuel pressure.

The volume flow control valve 56 may also be integrated into the high-pressure pump 54. It is likewise possible for the electromechanical pressure regulator 57 and the volume flow control valve 56 to be designed such that they are adjusted by means of a common actuating drive.

The internal combustion engine is also assigned a control device 6 which forms a device for controlling the fuel supply device 5. The control device 6 is in turn assigned sensors which detect different measurement variables and determine in each case the measurement value of the measurement variable. As a function of at least one of the measurement variables, the control device 6 in turn determines actuating variables which are then converted into corresponding actuating signals for controlling actuating elements by means of corresponding actuating drives.

The sensors are for example a pedal position transducer, which detects the position of an accelerator pedal, a crankshaft angle sensor, which detects a crankshaft angle to which an engine rotational speed is then assigned, an air mass sensor, or a fuel pressure sensor 58 which detects a fuel pressure in the fuel accumulator 55, referred to hereinafter as the measurement value Pi of the fuel pressure sensor 58. Depending on the embodiment, any desired subset of the sensors, or else additional sensors, may be provided.

The actuating elements are designed for example as gas inlet or gas outlet valves, injection valves 34, spark plugs, a throttle flap, low-pressure pump 51, volume flow control valve 56 or electromechanical pressure regulator 57.

The internal combustion engine ICE preferably also has further cylinders, to which corresponding actuating elements are then assigned. The internal combustion engine ICE and in particular the fuel supply device 5 may however be of some other design.

The internal combustion engine ICE, which may also be referred to as a common rail system, preferably comprises the following components:
the fuel accumulator 55, which may also be referred to as "common rail" and which stores fuel at a predefinable fuel pressure,
the high-pressure pump 54 which supplies fuel to the fuel accumulator 55,
valves, for example the volume flow control valve 56 and/or the electromechanical pressure regulator 57, which can be actuated by the control device 6 and which, by means of a manipulation of the fuel inflow into the fuel accumulator 55 or the fuel outflow out of the fuel accumulator 55, permit regulation of the fuel pressure in the fuel accumulator 55,
the fuel pressure sensor 58, which detects in each case the present measurement value Pi of the fuel pressure sensor 58, which is representative of the fuel pressure in the fuel accumulator 55,
one or more than one injection valve 34, which may also be referred to as injector and which connects the fuel accumulator 55 to in each case one cylinder of the internal combustion engine ICE and which can be opened and closed by the control device 6, wherein in the open state, a pressure difference between the fuel pressure in the fuel accumulator 55 and a pressure prevailing in a combustion chamber 22 of the respective cylinder causes a metering, that is to say an injection, of a predefined fuel quantity into the respective cylinder, wherein said fuel quantity is dependent on an injection valve opening duration T of the respective injection valve 34 and the fuel pressure in the fuel accumulator 55, and
the control device 6.

The control device 6 is preferably designed in order, for a respective operating state of the internal combustion engine ICE, to specify a setpoint value for the fuel pressure in the fuel accumulator 55, to compare said setpoint value with the measurement value Pi of the fuel pressure sensor 58, and, by means of a predefined regulating algorithm, to activate the abovementioned valves in order to regulate the measurement value Pi of the fuel pressure sensor 58 to the setpoint value of the fuel pressure, to determine for the present operating state of the internal combustion engine ICE a fuel injection quantity M to be injected, to determine an actual fuel pressure P as a function of the measurement value Pi of the fuel pressure sensor 58, and at least as a function of the fuel injection quantity M and the measurement value Pi of the fuel pressure sensor 58 or the determined actual fuel pressure P in the fuel accumulator 55, to determine that injection valve opening duration T of the injection valves 34 which is suitable for actually injecting the desired fuel injection quantity M.

The control device 6 is designed in order, by means of a regulating algorithm, to regulate a rotational speed Ni of the internal combustion engine ICE, which may also be referred to as actual value of the rotational speed of the internal combustion engine ICE, to a predefined idle rotational speed Ns, which may also be referred to as setpoint value of the rotational speed of the internal combustion engine ICE at idle. Said regulating algorithm preferably indirectly or directly demands that fuel injection quantity M to be injected which is suitable for attaining and stabilizing the predefined idle rotational speed Ns.

An erroneous measurement value Pi of the fuel pressure sensor 58, for example as a result of drift, and therefore a faulty fuel pressure sensor 58, may yield erroneous injections. To reduce the risk of erroneous injections, a plausibility check of the measurement value Pi of the fuel pressure sensor 58 is carried out.

The actual fuel pressure P is a variable which plays a role in the realization of injections with the respectively predefined fuel injection quantity M. Here, the fuel injection quantity M is seen preferably as a predefined setpoint value. The respective fuel injection quantity M is realized by virtue of the respective injection valve 34 being opened for the respectively predefined injection valve opening duration T. During said injection valve opening duration T, the pressure difference between the fuel accumulator 55 and the combustion chamber of the respective cylinder causes the flow of fuel from the fuel accumulator 55 into the combustion chamber of the respective cylinder.

The fuel injection quantity M is determined substantially as a function f of the injection valve opening duration T and the measurement value Pi of the fuel pressure sensor 58 or the actual fuel pressure P: M=f(T, Pi) or M=f(T, P). Here, the function f is in particular predefined as a function of a design of the respective injection valve 34. The control device 6 is designed to determine, for the predefined fuel injection quantity M, the injection valve opening duration T associated with the actual fuel pressure P presently prevailing in the fuel accumulator 55. For this purpose, the function f is preferably provided in inverted form as a function g in the control device 6. The function g is preferably stored in the form of a characteristic map in the control device 6. The function g may also be referred to as a TI characteristic map.

If the measurement value Pi of the fuel pressure sensor 58 does not substantially correspond to the actual fuel pressure P but rather corresponds to a fuel pressure P+dP deviating therefrom, that is to say Pi=P+dP, this will generally lead to a deviating injection valve opening duration T+dT and, as a result, to a deviating and erroneous specification of the fuel injection quantity M+dM: T+dT=g(M, P+dP), M+dM=f(T+dT, P) =f(g (M, P+dP), P). As long as dP does not assume any extreme values, in most operating states of the internal combustion engine ICE, said deviation does not lead to a significant impairment of operation. A driver can compensate for the deviation by adapting the accelerator pedal position.

A predefined idle operating state LBZ of the internal combustion engine ICE, however, represents a special circumstance. In the predefined idle operating state LBZ of the internal combustion engine ICE, the fuel injection quantity M will be predefined not by the driver demand, that is to say by the accelerator pedal position, but rather by a rotational speed regulator (FIG. 2) which represents the abovementioned regulating algorithm for regulating the rotational speed Ni of the internal combustion engine. Said rotational speed regulator, in a steady state, demands that fuel injection quantity M which is suitable for stabilizing the predefined idle rotational speed Ns. In general, said fuel injection quantity M is a function of a present load L of the internal combustion engine ICE, that is to say for example a function of additional consumers, such as for example an air-conditioning system, which are each in operation during the idle operating state LBZ. Aside from such additional consumers, however, generally always the same load state prevails in the predefined idle operating state LBZ, such that the rotational speed regulator always demands the same fuel injection quantity M for a respectively predefined load state if the fuel pressure sensor 58 is operating correctly. However, if the fuel pressure sensor 58 outputs the erroneous deviating fuel pressure P+dP, the rotational speed regulator must adapt the demanded fuel injection quantity M such that an actually injected fuel quantity corresponds to the predefined fuel injection quantity M. The rotational speed regulator thus demands for example an adapted fuel injection quantity M+m, such that the following applies: g(M+m, P+dP)=g(M, P)=T. Then, for the actually injected fuel injection quantity, the following applies: f(g(M+m, P+dP), P)=f(g(M, P), P)=f(T, P)=M. A quantity change value m of the demanded fuel injection quantity M, which may also be referred to generally as a change value A, may be utilized as a measure for a pressure difference dP between the measurement value Pi of the fuel pressure sensor 58 and the actual fuel pressure P.

The plausibility check of the measurement value Pi of the fuel pressure sensor 58 may take place for example as follows: the fuel injection quantity M to be demanded by the rotational speed regulator when the fuel pressure sensor 58 is operating without faults and is therefore functioning correctly is stored in the control device 6 as a predefined reference value REF. Said fuel injection quantity M may be either stored by calibrative means or learned in an adaptation process when the vehicle is new. The fuel injection quantity M presently demanded by the rotational speed regulator is compared at predefined intervals with the predefined reference value REF. An error ERR of the measurement value Pi of the fuel pressure sensor 58 and/or a fault of the fuel pressure sensor 58 can be inferred as a function of the determined quantity change value m=M−REF. A relationship between the respective quantity change value m and the respectively associated pressure difference dP may be easily determined for example by targeted trimming of the measurement value Pi of the fuel pressure sensor 58 and may be stored in the control device 6, as described further below. In this way, from known quantity change value m, the pressure difference dP can be determined as a magnitude of the error of the measurement value Pi of the fuel pressure sensor 58.

Figure 2:
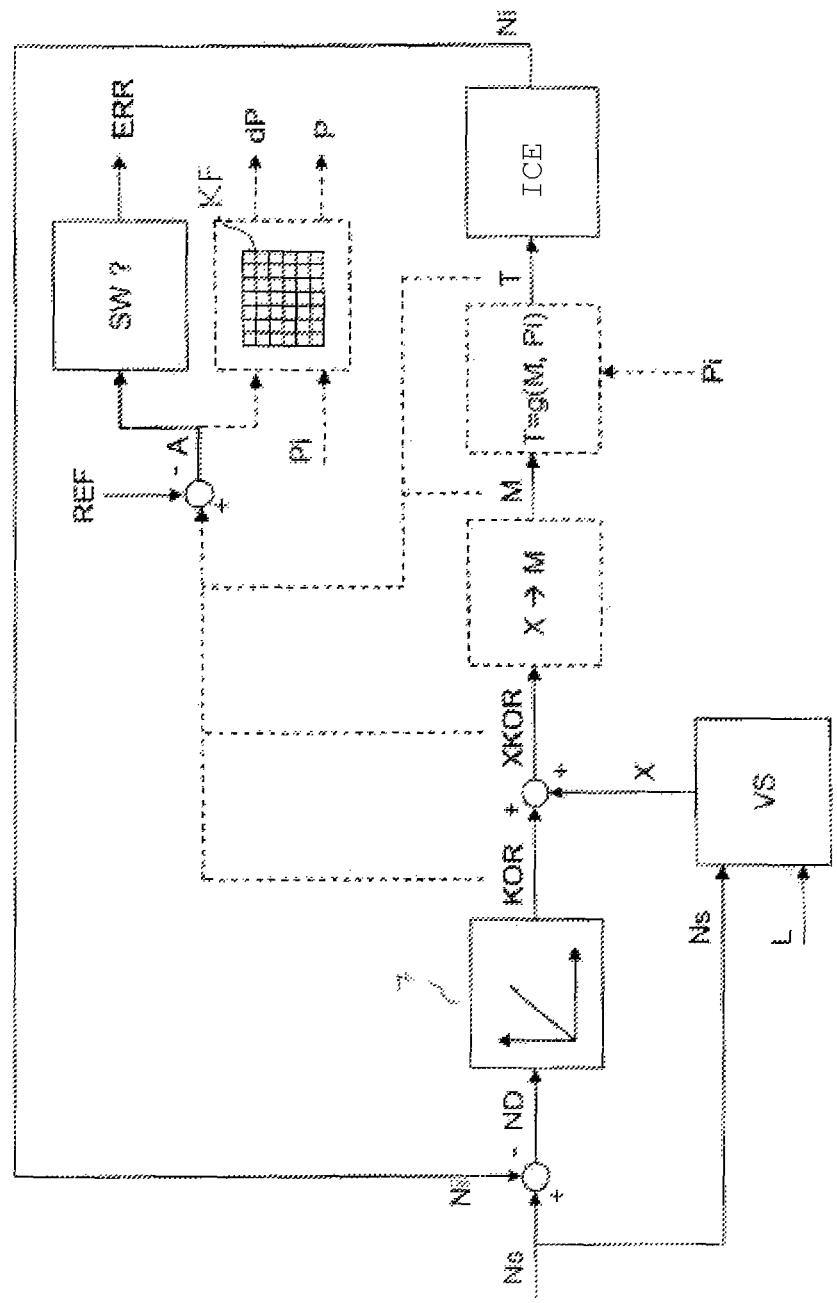
FIG. 2 shows a block diagram.

FIG. 2 shows the rotational speed regulator. As a function of the present rotational speed Ni of the internal combustion engine ICE and the predefined idle rotational speed Ns, a rotational speed difference ND is determined which is supplied to a regulator 7. The regulator 7 determines a corrective value KOR and provides this at the output side. It is preferable for a pilot controller VS to be provided which determines a pilot control value X as a function of the predefined idle rotational speed Ns and the present load L. As a function of the corrective value KOR of the regulator 7 and the pilot control value X of the pilot controller VS, a corrected pilot control value XKOR is determined. The corrective value KOR and the pilot control value X may for example represent the fuel injection quantity M or the injection valve opening duration T or a torque of the internal combustion engine ICE or some other variable. It may however also be provided that in particular the fuel injection quantity M and/or the injection valve opening duration T are determined as a function of the corrective value KOR or the corrected pilot control value XKOR. The injection valve opening duration T is determined for example as a function of the determined fuel injection quantity M and the measurement value Pi of the fuel pressure sensor 58. The respective injection valve 34 of the internal combustion engine is actuated as a function of the determined injection valve opening duration T. The present rotational speed Ni of the internal combustion engine ICE is detected or determined.

As a function of the predefined reference value REF and a value of an actuating variable for the metering of the fuel, said actuating variable being formed for example by the corrective value KOR, the corrected pilot control value XKOR, the fuel injection quantity M or the injection valve opening duration T, the change value A is determined for example as a difference between the value of the actuating variable and the predefined reference value REF, or as a quotient of said values. The change value A represents a degree of deviation of the value of the actuating variable from the predefined reference value REF. An error ERR of the measurement value Pi of the fuel pressure sensor 58 is inferred as a function of the determined change value A and preferably as a function of a predefined threshold value SW. In other words, the error ERR is inferred if the value of the actuating variable deviates from the predefined reference value REF by at least a predefined magnitude or factor.

It may also be provided that, as a function of the change value A, the associated pressure difference dP is determined, preferably by means of a characteristic map KF. Alternatively or in addition, it may also be provided that the actual fuel pressure P is determined, preferably likewise by means of the characteristic map KF, as a function of the change value A and the measurement value Pi of the fuel pressure sensor 58.

Figure 3:
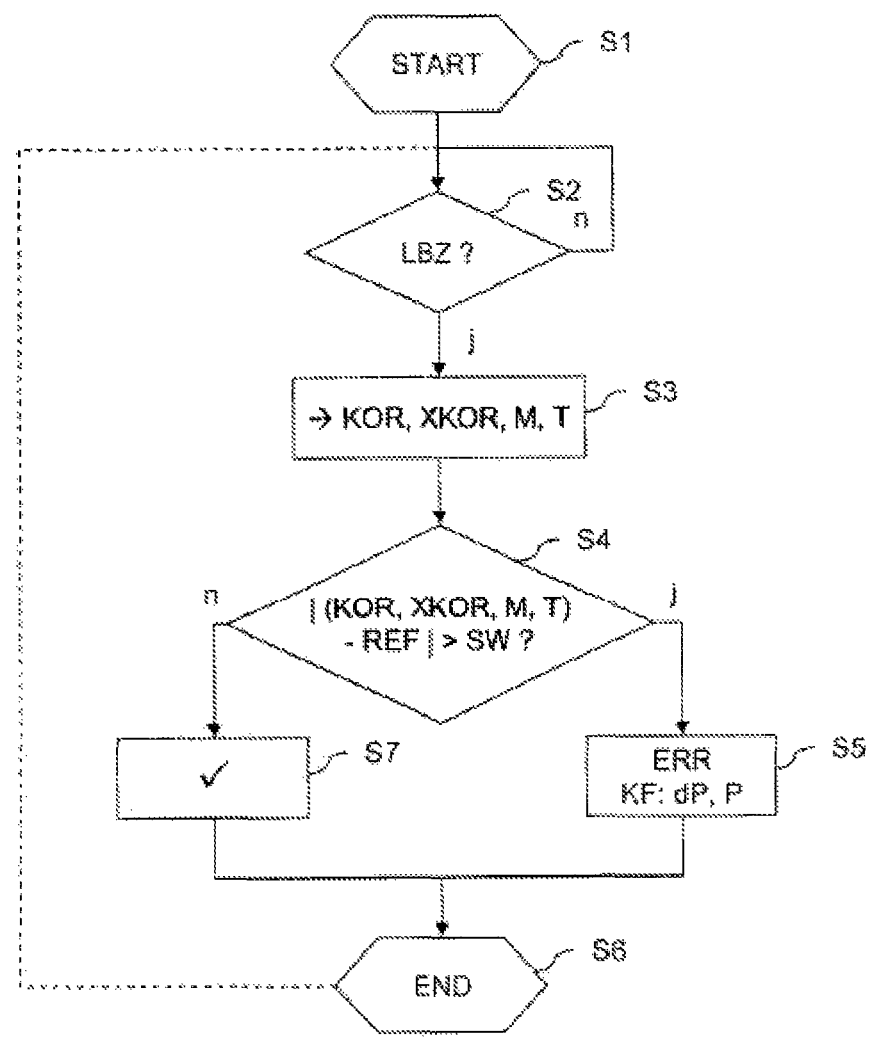
FIG. 3 shows a first flow diagram.

FIG. 3 shows a first flow diagram of a program for operating the internal combustion engine ICE. The program serves for checking the plausibility of the measurement value Pi of the fuel pressure sensor 58. The control device 6 is designed to execute the program. The control device 6 may therefore also be referred to as device for operating the internal combustion engine ICE. The program begins in a step S1. In a step S2, it is checked whether the internal combustion engine ICE is presently operating in its predefined idle operating state LBZ. Here, it is preferably also checked whether, in this regard, a stable, that is to say steady or non-transient state is present. If so, then the rotational speed Ni is regulated to the idle rotational speed Ns, and in a step S3, that value of the actuating variable for the metering of the fuel which is required for attaining the predefined idle rotational speed Ns is determined, that is to say for example the corrective value KOR or the corrected pilot control value XKOR or the fuel injection quantity M or the injection valve opening duration T. In a step S4, it is checked whether the determined required value of the actuating variable deviates from the reference value REF, which is predefined for the predefined idle operating state LBZ of the internal combustion engine ICE, by at least the predefined magnitude or factor, for example by virtue of a magnitude of a difference between the value of the actuating variable and the predefined reference value REF being compared with the predefined threshold value SW. If the condition in step S4 is satisfied, that is to say for example if the magnitude exceeds the predefined threshold value SW, then in a step S5, the error ERR of the measurement value Pi of the fuel pressure sensor 58 is inferred.

It may furthermore be provided that the pressure difference dP and/or the actual fuel pressure P be determined, for example by means of the characteristic map KF, as explained above. The actual fuel pressure P thus determined may be used as a basis for the further operation of the internal combustion engine. The program ends in a step S6 and is preferably executed anew in step S2. However, if the condition in step S4 is not satisfied, that is to say the determined change value A is too small, then the program continues in a step S7, in which it is inferred that the fuel pressure sensor 58 is functioning correctly and the measurement value Pi thereof is substantially error-free. The program is ended in the step S6, or preferably continued in the step S2.

Figure 4:
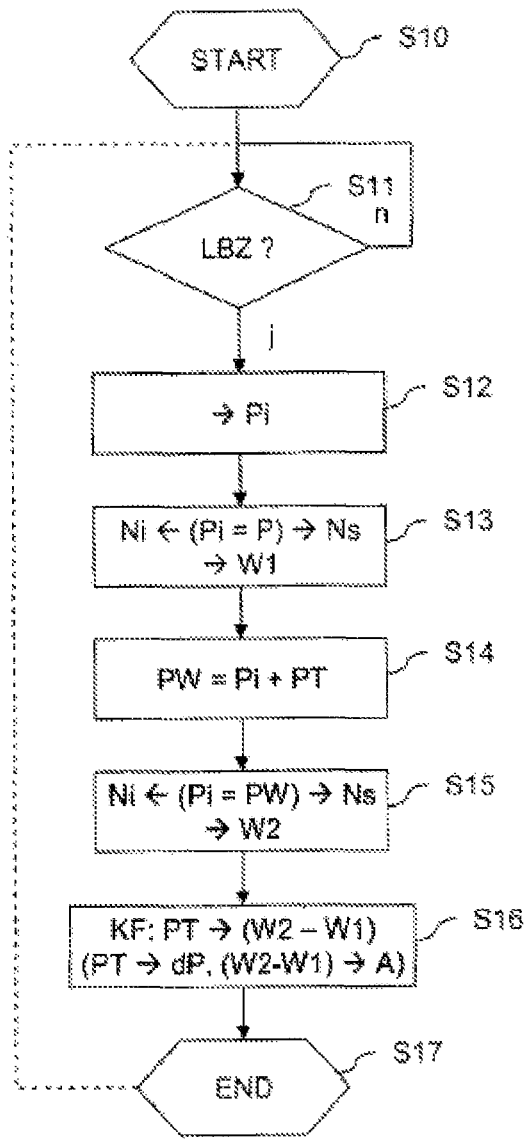
FIG. 4 shows a second flow diagram.

FIG. 4 shows a second flow diagram of a program for operating the internal combustion engine ICE. The program serves for determining the characteristic map KF which can be used in the program according to the first flow diagram, and therefore also serves for checking the plausibility of the measurement value Pi of the fuel pressure sensor 58. The control device 6 is preferably also designed to execute this program. The program begins in a step S10. The step S10 is executed preferably during the course of driving tests or tests on an engine test bed or for example during the course of a calibration or the like in a new vehicle. The step S10 is preferably executed after it has been ensured that the fuel pressure sensor 58 is functioning correctly, that is to say the error ERR of the measurement value Pi of the fuel pressure sensor 58 is not present. For example, for this purpose, the program according to the first flow diagram is executed.

In a step S11, it is checked whether the internal combustion engine ICE is presently operating in its predefined idle operating state LBZ. If so, then the measurement value Pi of the fuel pressure sensor 58 is detected in a step S12. In a step S13, the rotational speed Ni of the internal combustion engine ICE is regulated to the idle rotational speed Ns, such that a stable, that is to say steady or non-transient state is present. Then, a first value W1 of the actuating variable for the metering of the fuel is determined, that is to say for example the corrective value KOR or the corrected pilot control value XKOR or the fuel injection quantity M or the injection valve opening duration T. In a step S14, a fuel pressure check value PW is determined as a function of the detected measurement value Pi and a predefined trim value PT, for example as a sum or quotient of said values. The fuel pressure check value PW is then used, as the measurement value Pi, as a basis for the rotational speed regulation. By means of the trim value PT, therefore, the measurement value Pi is trimmed so as to deviate from the actual fuel pressure P. In a step S15, which substantially corresponds to S13 but which is executed on the basis of the fuel check value PW, a second value W2 is determined correspondingly to the first value W1. In a step S16, as a function of the trim value PT, which corresponds to the pressure difference dP, and as a function of the first and second values W1, W2 of the actuating variable, the difference of which corresponds to the change value A, an entry is made in the characteristic map KF by virtue of said assignment of the trim value PT to the first and second value W1, W2, or to the difference thereof, being stored. The program ends in a step S17, and is preferably executed repeatedly for different trim values PT and/or fuel pressures in the fuel accumulator 55. The sequence of steps may also differ.

For example, the second value W2 and then the first value W1 may be determined.

A numerical example is presented below. For a predefined injection valve 34, the injected fuel injection quantities M are as listed in the following table:

| T | P | M = f (T, P) |
|---|---|---|
| 0.4 ms | 250 bar | 4 mg |
| 0.5 ms | 250 bar | 5 mg |
| 0.4 ms | 200 bar | 3 mg |
| 0.5 ms | 200 bar | 4 mg |

The setpoint value of the fuel pressure in the fuel accumulator 55 in the predefined idle operating state LBZ is 250 bar. As long as the fuel pressure sensor 58 is operating correctly, the pressure regulation adjusts the actual fuel pressure P to said value. The predefined idle rotational speed Ns is 800 rpm. To realize this, a torque-effective fuel injection quantity M of 4 mg/stroke is required. The rotational speed regulator demands said quantity. At the fuel pressure of 250 bar, therefore, an injection valve opening duration T of the injection valves 34 of 0.4 ms is set.

Below, it will now be assumed that the pressure sensor is outputting an erroneous value, specifically such that, at an actually prevailing fuel pressure of 200 bar, the measurement value Pi of the fuel pressure sensor 58 is 250 bar. In the predefined idle operating state LBZ, the pressure regulation stabilizes the measurement value Pi, corresponding to the setpoint value, to 250 bar, that is to say the actual fuel pressure P is stabilized at 200 bar. As long as the rotational speed regulator continues to demand the fuel injection quantity M of 4 mg/stroke, the value of 0.4 ms also continues to be predefined for the injection valve opening duration T of the injection valves 34. Because the actual fuel pressure P is however only 200 bar, the quantity effectively injected into the combustion chamber 22 of the respective cylinder falls to 3 mg/stroke (see table). Since 3 mg/stroke is not sufficient to maintain the predefined idle rotational speed of 800 rpm, the rotational speed regulator raises the demanded fuel injection quantity M from 4 mg/stroke to 5 mg/stroke. In this way, the injection valve opening duration T of the injection valves 34 is increased to 0.5 ms. Therefore, in relation to the error-free situation, the fuel injection quantity M demanded by the rotational speed regulator has been increased from 4 mg/stroke to 5 mg/stroke. Correspondingly, the injection valve opening duration T has been extended from 0.4 ms to 0.5 ms. Said information is evaluated in the control device 6, as explained above, in order to detect the error ERR of the measurement value Pi of the fuel pressure sensor 58. In this way, it is possible to check the plausibility of the measurement value Pi of the fuel pressure sensor 58 at non-zero fuel pressures in the fuel accumulator 55. In this way, it is possible to detect even those errors which have an effect not on the zero point but on non-zero fuel pressures. One possible example of this is a steepening or flattening of a sensor characteristic curve of the fuel pressure sensor 58.

The predefined reference value REF is for example determined experimentally and stored in the control device 6 and thereby predefined. The predefined reference value REF may be determined for example during the course of driving tests or on an engine test bed, or learned adaptively in a new vehicle.

What is claimed is:

1. A method for operating an internal combustion engine which comprises a fuel pressure sensor, the measurement value of which is representative of a fuel pressure in a fuel accumulator of the internal combustion engine from which fuel is metered into a combustion chamber of the internal combustion engine, the method, in a predefined idle operating state of the internal combustion engine, comprising:

regulating a rotational speed of the internal combustion engine to a predefined idle rotational speed and, during the course of said regulation, a value, which is required for attaining the predefined idle rotational speed, of an actuating variable for the metering of the fuel is determined, and inferring an error of the measurement value of the fuel pressure sensor if the determined required value of the actuating value deviates by at least a predefined magnitude or factor from a reference value predefined for the predefined idle operating state of the internal combustion engine.

2. The method according to claim 1, wherein, as a function of a degree of deviation of the determined required value of the actuating variable from the predefined reference value, by means of a predefined characteristic map, a magnitude or factor is determined by which the measurement value of the fuel pressure sensor deviates from an actual fuel pressure in the fuel accumulator.

3. The method according to claim 2, wherein the actual fuel pressure in the fuel accumulator is determined as a function of the determined magnitude or factor by which the measurement value of the fuel pressure sensor deviates from the actual fuel pressure in the fuel accumulator, and as a function of the measurement value of the fuel pressure sensor.

4. A method for operating an internal combustion engine which comprises a fuel pressure sensor, the measurement value of which is representative of a fuel pressure in a fuel accumulator of the internal combustion engine from which fuel is metered into a combustion chamber of the internal combustion engine, in which method, in a predefined idle operating state of the internal combustion engine, the method comprising:
- detecting the measurement value of the fuel pressure sensor,
- regulating a rotational speed of the internal combustion engine to a predefined idle rotational speed and, during the course of said regulation, a first value, which is required for attaining the predefined idle rotational speed, of an actuating variable for the metering of the fuel is determined under the assumption that the fuel pressure sensor is functioning correctly,
- determining a fuel pressure check value as a function of the detected measurement value of the fuel pressure sensor and as a function of a predefined trim value,
- regulating the rotational speed of the internal combustion engine to the predefined idle rotational speed under the assumption that the determined fuel pressure check value is the measurement value of the fuel pressure sensor, and during the course of said regulation, a second value, which is required for attaining the predefined idle rotational speed, of the actuating variable for the metering of the fuel is determined, and
- storing the predefined trim value, assigned to a degree of deviation of the determined second value from the determined first value, in a characteristic map.

5. The method according to claim 4, wherein the actuating variable is representative of a fuel injection quantity or an injection valve opening duration.

6. The method according to claim 5, wherein the required injection valve opening duration for the metering of the fuel is determined as a function of the measurement value of the fuel pressure sensor and the required fuel injection quantity.

7. A device for operating an internal combustion engine, the internal combustion engine comprising a fuel pressure sensor, the measurement value of which is representative of a fuel pressure in a fuel accumulator of the internal combustion engine from which fuel can be metered into a combustion chamber of the internal combustion engine,
the device being configured in order, in a predefined idle operating state of the internal combustion engine,
to regulate a rotational speed of the internal combustion engine to a predefined idle rotational speed and, during the course of said regulation, to determine a value, which is required for attaining the predefined idle rotational speed, of an actuating variable for the metering of the fuel, and
to infer an error of the measurement value of the fuel pressure sensor if the determined required value of the actuating value deviates by at least a predefined magnitude or factor from a reference value predefined for the predefined idle operating state of the internal combustion engine.

8. A device for operating an internal combustion engine, the internal combustion engine comprising a fuel pressure sensor, the measurement value of which is representative of a fuel pressure in a fuel accumulator of the internal combustion engine from which fuel is metered into a combustion chamber of the internal combustion engine,
the device being configured in order, in a predefined idle operating state of the internal combustion engine,
to detect the measurement value of the fuel pressure sensor,
to regulate a rotational speed of the internal combustion engine to a predefined idle rotational speed and, during the course of said regulation, to determine a first value, which is required for attaining the predefined idle rotational speed, of an actuating variable for the metering of the fuel, under the assumption that the fuel pressure sensor is functioning correctly,
to determine a fuel pressure check value as a function of the detected measurement value of the fuel pressure sensor and as a function of a predefined trim value,
to regulate the rotational speed of the internal combustion engine to the predefined idle rotational speed under the assumption that the determined fuel pressure check value is the measurement value of the fuel pressure sensor, and during the course of said regulation, to determine a second value, which is required for attaining the predefined idle rotational speed, of the actuating variable for the metering of the fuel, and
to assign the predefined trim value to a degree of deviation of the determined second value from the determined first value, and to store said assignment in a characteristic map.

9. The device according to claim 7, wherein, as a function of a degree of deviation of the determined required value of the actuating variable from the predefined reference value, by means of a predefined characteristic map, the device is further configured to determine a magnitude or factor by which the measurement value of the fuel pressure sensor deviates from an actual fuel pressure in the fuel accumulator.

10. The device according to claim 9, wherein the actual fuel pressure in the fuel accumulator is determined as a function of the determined magnitude or factor by which the measurement value of the fuel pressure sensor deviates from the actual fuel pressure in the fuel accumulator, and as a function of the measurement value of the fuel pressure sensor.

11. The device according to claim 8, wherein the actuating variable is representative of a fuel injection quantity or an injection valve opening duration.

12. The device according to claim 11, wherein the required injection valve opening duration for the metering of the fuel is determined as a function of the measurement value of the fuel pressure sensor and the required fuel injection quantity.

13. The method according to claim 1, wherein the actuating variable is representative of a fuel injection quantity or an injection valve opening duration.

14. The method according to claim 13, wherein the required injection valve opening duration for the metering of the fuel is determined as a function of the measurement value of the fuel pressure sensor and the required fuel injection quantity.

* * * * *